UNITED STATES PATENT OFFICE.

ORAZIO REBUFFAT, OF NAPLES, ITALY, ASSIGNOR TO POMILIO BROTHERS CORPORATION, OF NEW YORK, N. Y., A CORPORATION OF NEW YORK.

REFRACTORY SILICA BRICK AND PROCESS OF MANUFACTURE.

1,420,284.  Specification of Letters Patent.  Patented June 20, 1922.

No Drawing.  Application filed December 5, 1921. Serial No. 520,076.

*To all whom it may concern:*

Be it known that I, ORAZIO REBUFFAT, a citizen of Italy, residing at Naples, in the Province of Campania and Kingdom of Italy, have invented certain new and useful Improvements in Refractory Silica Bricks and Processes of Manufacture, of which the following is a specification.

The use of silica brick, or furnace lining, in high temperature furnaces has shown that, while bricks of this material possess the desirable refractory quality in very high degree, they, nevertheless, in general, show a marked tendency to swell or expand, or undergo a gradual increase in volume, resulting in disintegration and destruction of the furnace lining structure.

Investigation has demonstrated that the cause of the increase in the volume of silica brick after continued use in high temperature furnaces is to be found in the gradual transformation of the quartz, the specific gravity of which is 2.65, into other allotropic varieties of silica of lower density, or specific gravity, and especially into tridymite or cristobalite of specific gravity 2.26 to 2.33.

Having discovered this cause of the undesirable expansion of silica brick the process of manufacture of this class of brick has been modified by the introduction of a long-continued baking process at high temperature, usually around 1400° C., the object of which is to secure at least the partial transformation of quartz into tridymite during the process of manufacture. In this manner it has been sought to produce a silica refractory brick of constant volume. This method of manufacture has not been fully successful, and, nevertheless, is expensive because of the quantity of fuel required, the short life of the baking furnaces and the labor required in breaking down and rebuilding these furnaces. Furthermore, the results by this method are uncertain as it has been found that great variation exists in the degree to which different samples of natural quartz are transformed to tridymite, some undergoing little or no transformation, while others undergo more or less complete transformation when maintained at a sufficiently high temperature for a sufficient time.

My researches have discovered that satisfactory results may be obtained in the preparation of silica brick by adding a phosphate flux containing $P_2O_5$ substantially equivalent to .45% of the quartz used and heating this mixture to a temperature of from 1300° to 1350° say 8 hours or two-thirds or less of the time required by the old process, the resultant product will have a density of 2.27 to 2.30 and give only very slight indication of the presence of quartz. From such experiments it is found that the transformation of quartz into its allotropic varieties of lower density is greatly facilitated by the addition of small quantities of material containing the radical of phosphoric acid or phosphates. It will be understood that in the specification, by the term "phosphate" I mean any phosphate, such as, for example, calcium phosphate. Similar results will be obtained by replacing the phosphate or the radical of phosphoric acid with various salts or radicals non-volatile at high temperature of other acids, as, for example, boric, tungstic, and molybdic acid.

An outline of the present mode of manufacture of refractory silica brick includes, in general, the following essential steps: (1) crushing and grading the quartz to size by crushers, screening and sedimentation with water; (2) mixture of finely divided quartz with small quantities of clay, lime-cement or lime; (3) pressing of material into brick and air drying the same; (4) baking, first at moderate temperature, followed by prolonged baking at 1400° C.

My invention modifies the above procedure by the incorporation of small quantities of a phosphate or similar material during the process of mixing the quartz with the clay, lime-cement or lime. This admixture of phosphate or similar material, through its action in facilitating the transformation of quartz into its allotropic forms of lower specific gravity, makes it possible to decrease the time of baking in the last step to a few hours, in general not exceeding six.

While tridymite has been mentioned as one of the materials it has been used merely for purposes of illustration, since it is known that tridymite is one of the allotropic modifications of quartz obtained in the application of the process. It is desired, however, to cover herein the possible and probable conversion of quartz into the variety known as cristobalite. In broad general terms, however, the invention refers to the aiding, or facilitating, or hastening, of the conversion of quartz into the various allotropic forms of lower specific gravity.

The invention also covers the certain and definite transformation of all varieties and kinds of quartz, either natural or artificial, into allotropic forms of lower specific gravity.

The use of a phosphate as the reagent for securing this rapid and complete transformation of quartz has been made for purposes of illustration and experimentation. The invention, however, refers also to the use of other materials of similar nature which could be substituted for a phosphate or salts or compounds of phosphoric acid in its various forms such as, for example, salts and compounds of boric acid, salts and compounds of tungstic acid, salts and compounds of molybdic acid, and other materials of like, or similar, nature, as, in general, the salts and compounds of other acids non-volatile at high temperature. It is further understood that, owing to the conditions of baking the brick, whereby compounds of phosphorus, tungsten, molybdenum, etc., would, during the process, be converted into phosphoric, tungstic and molybdic oxides and acids, the invention anticipates such possible transformation and, therefore, covers the primary use of any such material which during the process would naturally be converted into compounds recognized as essential to this process.

While mention has been made of the use of phosphate flux containing $P_2O_5$ in the proportion of .45% of the total quartz, this quantity has been used for purposes of illustration and is perhaps that to be preferred, although it is understood that variations through a considerable range from this quantity can be made according to the temperature and the time at which the subsequent heating is to be continued.

The invention may be practised as follows, this statement being based upon actual test and experience: 1,000 pounds of pulverized quartzite or ganister may be thoroughly mixed with 11 pound of pulverized apatite. According to average analyses this will furnish the equivalent of 4.5 pounds of $P_2O_5$ or .45% of the quartz as above suggested, and a desirable portion of the lime required to form the binder. At the appropriate period in the process, additional lime, equivalent to 14 pounds of CaO is added, but as the addition of an appropriate quantity of lime to form the binder is common practice, this step of the process need not be further elaborated upon.

While I consider the $P_2O_5$ in whatever substance it may be contained or with whatever ingredients it may be combined, as an essential element in the invention and in securing the result claimed, I wish it to be understood that my invention is not limited to the use of this substance by itself, but that it may be combined with various substances, such as borax, feldspar, and materials of like nature, either for the purpose of securing desirable results in special materials or for the purpose of dilution or securing better distribution. For example, I have prepared a flux by fusing together 2 parts by weight of calcium phosphate, 2 parts by weight of calcined borax, and 1 part by weight of feldspar, which I have found to be satisfactory.

For the purpose of this invention the possibility of the use of the various forms in which calcium phosphate occurs in nature should be recognized, and I therefore wish to have it understood that all such forms are included within the scope of my invention and that the use of such materials as phosphate rock, phosphorite, bone phosphate, guano, and any others containing phosphate in their natural state, are to be included as among materials the use of which is contemplated. In other words, while calcium phosphate is specifically mentioned, it should be understood that in the manufacture of a commerical material such as brick, the crude forms of calcium phosphate as they occur in nature are to be included within the scope of the invention.

Whatever acid radical is used in this process will be present in combination with a base and will function solely as a combined or bound acid radical.

This application is filed as a substitute for application No. 404,464, filed August 18, 1920, and is a continuation in part of said application, which said application was filed as a substitute for application No. 389,260, filed June 15, 1920.

It will be understood, further, that while $P_2O_5$ by itself is volatile at temperatures below the temperature required for the baking of the brick and therefore would not be appropriate except when combined with other substances capable of converting it into a salt non-volatile at high temperature, yet by the addition of a sufficient quantity of lime, phosphoric acid in appropriate quantities may be added and when combined therewith, will form calcium phosphate containing the quantity of $P_2O_5$ required for the purposes of this invention, and that such use of phosphoric acid, or its combination with any other carrier found adapted for the purpose, is contemplated by this invention.

Having thus fully described my said invention what I claim as new and desire to secure by Letters Patent is:

1. The process of rapid conversion of quartz into its allotropic varieties of lower specific gravity by incorporating therein small quantities of the radicals of acids non-volatile at high temperature and calcining the same and recovering said allotropic varieties of said quartz of lower specific gravity than quartz, substantially as set forth.

2. The process of manufacture of constant volume refractory silica brick from quartz which includes incorporating therein quantities of the radical of phosphoric acids, pressing the material into brick, drying, and burning until the quartz is converted into its allotropic varieties of lower specific gravity, substantially as set forth.

3. The process of manufacture of constant volume refractory silica brick from quartz which includes incorporating therein lime and phosphoric acid, forming the material into brick, drying, and burning, substantially as set forth.

4. The process of manufacture of constant volume refractory silica brick from quartz which includes incorporating therein phosphoric acid and a binder and material which will serve as a carrier for the phosphoric acid, forming the same into brick, drying, and burning, substantially as set forth.

5. A baked refractory silica brick comprising essentially the allotropic form of quartz of specific gravity lower than quartz and an acid radical non-volatile at high temperature.

6. A baked refractory silica brick comprising essentially the allotropic form of quartz of specific gravity lower than quartz and material containing a phosphate radical.

7. A baked refractory silica brick comprising essentially the allotropic form of quartz of specific gravity lower than quartz and containing lime and phosphoric acid.

8. A baked refractory silica brick comprising the allotropic form of quartz of specific gravity lower than quartz and containing phosphoric acid and a binder material.

9. The process of rapid conversion of quartz by incorporating therein small quantities of the radicals of acids non-volatile at high temperature, calcining the same, and recovering allotropic varieties of lower specific gravity than said quartz, substantially as set forth.

10. The process of rapid conversion of quartz into its allotropic varieties of lower specific gravity by incorporating therein small quantities of the radicals of acids capable of chemical combination with silica and non-volatile at high temperature, and calcining the same, substantially as set forth.

In witness whereof, I have hereunto set my hand and seal at Naples, Italy, this 25th day of September, A. D. nineteen hundred and twenty-one.

PRF. ORAZIO REBUFFAT. [L. S.]

Witnesses:
A. GUONIER,
EWICO BULPFOR.